US009166819B2

(12) United States Patent
Liu

(10) Patent No.: US 9,166,819 B2
(45) Date of Patent: Oct. 20, 2015

(54) METHOD AND DEVICE FOR REALIZING FLEXIBLE QINQ

(75) Inventor: Yang Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 464 days.

(21) Appl. No.: 13/575,707

(22) PCT Filed: Jun. 21, 2010

(86) PCT No.: PCT/CN2010/074156
§ 371 (c)(1),
(2), (4) Date: Jul. 27, 2012

(87) PCT Pub. No.: WO2011/097859
PCT Pub. Date: Aug. 18, 2011

(65) Prior Publication Data
US 2012/0300785 A1  Nov. 29, 2012

(30) Foreign Application Priority Data

Feb. 10, 2010 (CN) .......................... 2010 1 0114132

(51) Int. Cl.
*H04L 12/46* (2006.01)
*H04L 29/12* (2006.01)
(Continued)

(52) U.S. Cl.
CPC ........ *H04L 12/4641* (2013.01); *H04L 12/4633* (2013.01); *H04L 12/4654* (2013.01);
(Continued)

(58) Field of Classification Search
CPC .............. H04L 12/465; H04L 12/4654; H04L 12/4658; H04L 12/4633; H04L 12/4641; H04L 12/4679

USPC .................................... 370/395.53, 389, 401
See application file for complete search history.

(56) References Cited

U.S. PATENT DOCUMENTS 7,558,273 B1    7/2009  Grosser, Jr. et al.
2004/0174828 A1*  9/2004  Elie-Dit-Cosaque et al. 370/254
(Continued)

FOREIGN PATENT DOCUMENTS

CN    1838627 A    9/2006
CN    1929444 A    3/2007
(Continued)

OTHER PUBLICATIONS

Zhu, Qingying, Machine English Translation of CN 100459587, Published Feb. 4, 2009, Translated on Nov. 12, 2014.*
(Continued)

*Primary Examiner* — Dang Ton
*Assistant Examiner* — Ryan Kavleski
(74) *Attorney, Agent, or Firm* — Ling Wu; Stephen Yang; Ling and Yang Intellectual Property

(57) ABSTRACT

A method for realizing flexible QinQ, including: after receiving a message, searching for a Media Access Control (MAC) address entry corresponding to the message in a MAC address table, if the corresponding MAC address entry is searched out, performing flexible QinQ for the received message according to the flexible QinQ information included in the MAC address entry, and forwarding the message after completing the flexible QinQ transformation. The present invention also provides a device for realizing flexible QinQ and a QinQ transformation board. The present invention gets rid of a high-cost network processor, enables storage of the flexible QinQ information and fast forwarding of the messages just on a simple interface board, it overcomes the problem in the prior art that the speed of massively searching the QinQ entry is slow and enlarges the profits of operators and network product users at the same time.

14 Claims, 2 Drawing Sheets

(51) Int. Cl.
  *H04L 12/743* (2013.01)
  *H04L 12/931* (2013.01)
(52) U.S. Cl.
  CPC ........ *H04L12/4658* (2013.01); *H04L 12/4666* (2013.01); *H04L 49/35* (2013.01); *H04L 61/6022* (2013.01); *H04L 45/7453* (2013.01); *H04L 49/354* (2013.01)

(56) References Cited

U.S. PATENT DOCUMENTS

| | | | |
|---|---|---|---|
| 2006/0007939 A1* | 1/2006 | Elangovan | 370/395.53 |
| 2006/0059325 A1* | 3/2006 | Milne et al. | 711/200 |
| 2006/0221960 A1* | 10/2006 | Borgione | 370/390 |
| 2006/0274771 A1 | 12/2006 | Doi | |
| 2007/0133549 A1 | 6/2007 | Lee et al. | |
| 2010/0106791 A1* | 4/2010 | Dai et al. | 709/206 |
| 2010/0271980 A1* | 10/2010 | Kini et al. | 370/256 |
| 2013/0003530 A1* | 1/2013 | Davari | 370/225 |

FOREIGN PATENT DOCUMENTS

| | | | |
|---|---|---|---|
| CN | 1960336 A | | 5/2007 |
| CN | 101133605 A | | 2/2008 |
| CN | 100459587 C | * | 2/2009 |
| EP | 2071766 A1 | | 6/2009 |
| WO | 2009127128 A1 | | 10/2009 |

OTHER PUBLICATIONS

International Search Report for PCT/CN2010/074156 dated Oct. 27, 2010.

* cited by examiner

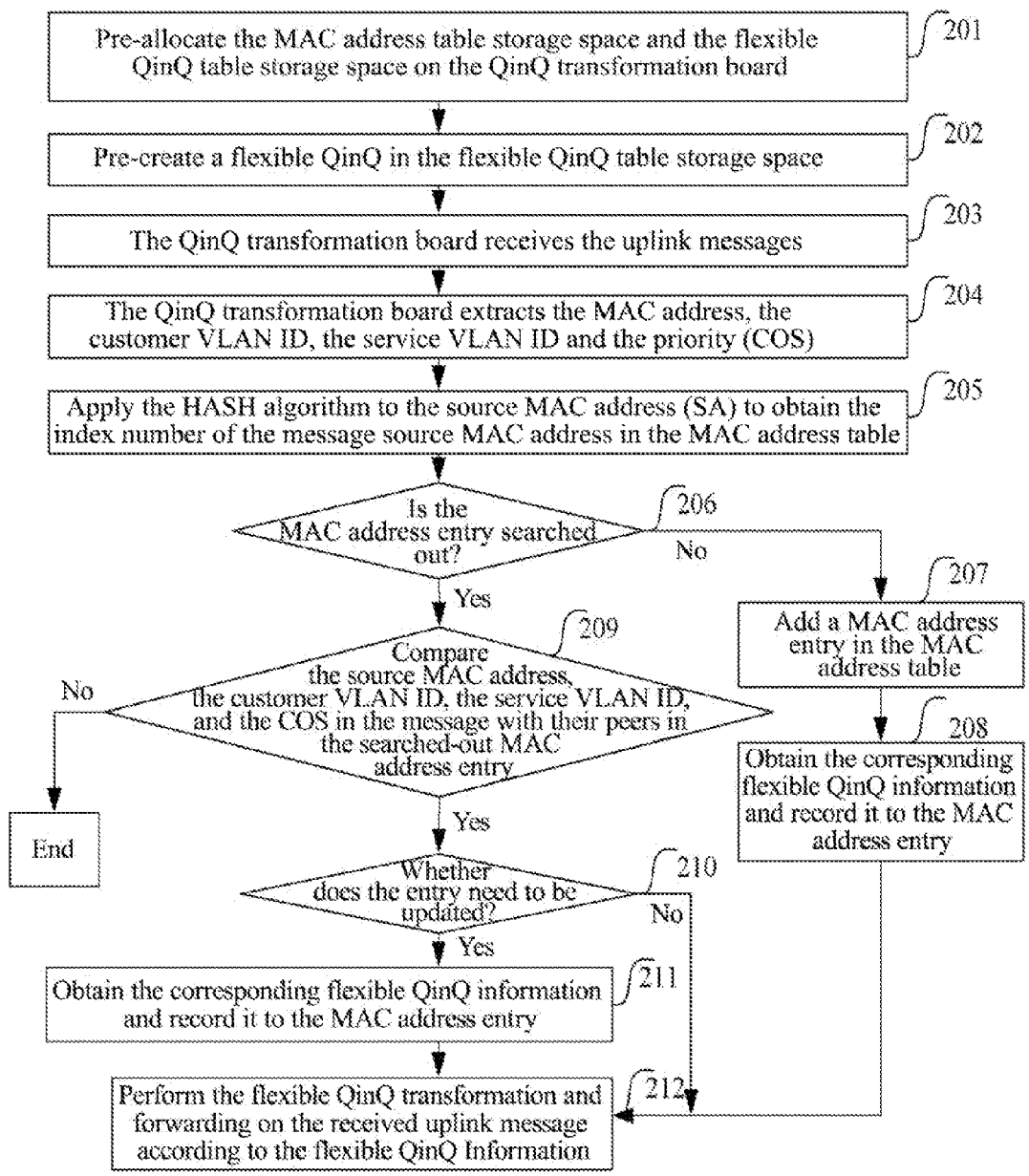

METHOD AND DEVICE FOR REALIZING FLEXIBLE QINQ

TECHNICAL FIELD

The present invention relates to the field of layer 2 switching technology, and more especially, to a method and device for implementing flexible QinQ.

BACKGROUND OF THE RELATED ART

The QinQ technology is a visualized name of a tunneling protocol based on a two-layer 802.1Q encapsulation, its core idea is to encapsulate the Virtual Local Area Network Tag (VLAN tag) of the user network to the VLAN tag of the backbone network such as the operator network or the Internet Service Provider (ISP) network, and the message is passing through the backbone network with two layers of VLAN Tag.

The port in the Backbone for the user access is called as the user port. When the source user network interconnects with the destination user network through the backbone network, after a user message (the message is in the common format) is received at the user port, a new layer of VLAN Tag (the backbone network VLAN Tag) is encapsulated on the basis of the message's original VLAN Tag (user network VLAN Tag), that is, "Add QinQ" encapsulation to the message. Thereafter, the QinQ encapsulated message is transmitted. Before the message is sent to the destination user network by another user port in the backbone network, the encapsulation of the added backbone network VLAN Tag is removed to restore the message to be in the common format, that is "remove the QinQ" encapsulation. At this point, the message received by the destination user network is consistent with the message sent by the source user network.

Since the backbone network might encounter the link switching during the transmission process, it needs to transform the VLAN Tag in order to continue to transmit messages in the link after the switching. Moreover, when it needs to make different processing on the message, it also needs to transform the VLAN Tag, that is, transform the QinQ encapsulation to adapt to the new link.

FIG. 1 is a schematic diagram of the QinQ encapsulation format, and the QinQ encapsulation format comprises: the destination Media Access Control (MAC) address (DA), the source MAC address (SA), the outer VLAN Tag (Stag, Service tag), the inner VLAN Tag (Ctag, Customer tag), Type/Length, payload and cyclic redundancy check (CRC). Wherein, both the Stag and the Ctag comprise: Tag Protocol Identification (TPID) and tag control information (TCI).

The TPID is a tag used to identify the received messages between different network devices in the network interconnection, in a mature protocol, the TPID might be a standard protocol number, for example, the TPID in the inner VLAN Tag of the QinQ protocol has the standard protocol number 8100, the TPID in the outer VLAN Tag of the QinQ protocol currently has no fixed standard protocol number so far. The TCI generally comprises three aspects of content: priority, VLAN identification (VLAN ID) and canonical format indicator (CFI). Wherein, the priority is used to specify the priority level of the current message frame, generally there are eight priority levels; the VLAN ID is used to specify the VLAN that the current message belongs to.

Typically, the QinQ only supports simple configuration strategy based on the outer VLAN Tag or a combination of the outer VLAN Tag and the user port, that is, the outer VLAN Tag of the received message or a combination of the outer VLAN Tag and the user port is taken as the identification to add an encapsulation to the message, remove the encapsulation of the message or transform the encapsulation of the message. However, in practical applications, it might need to implement more configuration strategies on the QinQ, for example, perform operations such as adding encapsulation, removing the encapsulation or transforming the encapsulation, and so on according to the outer VLAN Tag and the priority of the message, or according to the outer VLAN Tag and the customer VLAN tag, or according to the service VLAN tag, the inner VLAN Tag and the priority, and so on, therefore, the concept of flexible QinQ appears, and the flexible QinQ supports enriched configuration strategies.

Currently, the flexible QinQ has no fixed service TPID standard protocol number, therefore, when implementing the flexible QinQ in the prior art, different manufacturers usually have different values set for the service TPID, therefore, in practical applications, there will have situations that the service TPIDs are not compatible with each other. Moreover, in order to achieve the flexible QinQ technology, generally a network processor (NP) is used in the prior art to deploy the QinQ configuration strategy and store a variety of required data. The NP uses a special memory to place the required data information in a table, supports to search for the address based on the content, and can retrieve information with relatively long length, but the price of the NP itself is relatively high, thus the cost of this implementation is relatively high, which is not conducive to market competition.

The specification of the Chinese patent application whose application number is 200610138023.4 disclosed a method and device for implementing flexible QinQ, and this method comprising: presetting a QinQ table in a chip, storing the data required by the flexible QinQ configuration strategy, receiving messages, query in the data needed by the flexible QinQ configuration strategy according to the customer VLAN ID, the service VLAN ID and the priority of a received message; obtain the required data from the flexible QinQ configuration strategy data through the query, and use the obtained data to execute the QinQ operation on the message.

The defects of the aforementioned method are: for each received message, a linear combination or a HASH operation result of the customer VLAN ID, the service VLAN ID and the priority should be used as an index to search for the data required by the flexible QinQ configuration strategy, the method of linear combination increases the amount of memory usage, this is because of that the two VLAN IDs and the priorities occupy 27 bits, while the linear index table also takes up to 134 M bytes of memory space. The mode of Hash operation is more feasible, but the data in the QinQ table have been stored in the chip before processing the messages. Regardless of using the table entries or not, they can be polled when looking up the table, therefore, query of the QinQ table is a massive query in practical applications, and if each received message needs a massive query in the QinQ table, it will significantly consume the processor and memory resources, and is very inefficient, moreover, no matter what method is used to query the QinQ table, the purpose of forwarding messages with high flow wire-speed is hard to be achieved.

SUMMARY OF THE INVENTION

The technical problem to be solved in the present invention is to provide a method and device for implementing flexible QinQ to solve the problem that the existing method occupies large resources and is inefficient to achieve the flexible QinQ function with less resource occupation and higher efficiency to forward the messages with high speed.

To solve the aforementioned technical problem, a method for implementing flexible QinQ in the present invention comprises:

after receiving a message, search for a media access control (MAC) address entry corresponding to the message in a MAC address table, if the corresponding MAC address entry is searched out, performing flexible QinQ transformation on the received message in accordance with flexible QinQ information included in the MAC address entry, and forwarding the message after completing the flexible QinQ transformation.

The message is an uplink message;

after the step of searching for a media access control (MAC) address entry corresponding to the message in a MAC address table, the method also comprises:

if the corresponding MAC address entry is not searched out, adding a MAC address entry in the MAC address table, recording a MAC address, a priority, a customer virtual local area network (VLAN) identification (VLAN ID), and a service VLAN ID extracted from the uplink message, querying corresponding flexible QinQ information in the pre-configured flexible QinQ table, and recording it to the added MAC address entry.

After the step of recording the QinQ information to the added MAC address entry, the method also comprises:

performing flexible QinQ transformation on the received uplink message based on the flexible QinQ information queried from the flexible QinQ table, and forwarding the message after completing the flexible QinQ transformation.

The message is an uplink message;

after searching out the corresponding MAC address entry, said method also comprises: comparing the MAC address, the priority, the customer VLAN ID, and the service VLAN ID extracted from the uplink message with the MAC address, the priority, and the customer VLAN ID and the service VLAN ID in the corresponding searched-out MAC address entry, if the comparison result is that they are not identical, ending.

Said method also comprises: if the comparison result is that they are identical, checking whether the update identification in the corresponding MAC address entry identifies that a update is needed or not, if yes, querying the corresponding flexible QinQ information from the pre-configured flexible QinQ table, updating the corresponding MAC address entry, and continuing to process the step of implementing a flexible QinQ transformation on the received message; otherwise, continuing to process the step of implementing a flexible QinQ transformation on the received message.

The message is a downlink message; after the step of searching for the corresponding MAC address entry of the message in the MAC address table, said method also comprises: if the corresponding MAC address entry is not searched out, directly forwarding or discarding the downlink message.

The MAC address entry in the MAC address table comprises an aging identification;

the method also comprises: if the MAC address entry is not learnt or queried in the aging time, setting the aging identification to identify that the MAC address entry has aged, and deleting the aged MAC address entry according to the aging identification.

The flexible QinQ information comprises: information of the new customer VLAN ID, the new service VLAN ID, the new priority, and the new transformation operation.

To solve the aforementioned technical problem, a device for flexible QinQ, comprising: a QinQ transformation board, an uplink device, a core switching module and other switching systems, the QinQ transformation board being connected with the uplink device, the core switching module and the other switching systems, wherein:

the QinQ transformation board is set to: receive messages sent by the uplink device, the core switching module and the other switching systems, after receiving a message, search for the MAC address entry corresponding to the message in the Media Access Control (MAC) address table, and if the corresponding MAC address entry is searched out, perform a flexible QinQ transformation on the received message according to the flexible QinQ information included in the MAC address entry, and forward the message after completing the flexible QinQ transformation.

To solve the aforementioned technical problem, the QinQ transformation board in the present invention is set to:

receive messages sent by a uplink device, a core switching module and other switching system, after a message is received, search for a MAC address entry corresponding to the message in a media Admission Control (MAC) address table, and if the corresponding MAC address entry is searched out, perform a flexible QinQ transformation on the received message based on the flexible QinQ information included in the MAC address entry, and forward the message after completing the flexible QinQ transformation.

The message is an uplink message; the QinQ transformation board is also set to: if the corresponding MAC address entry is not searched out, add a MAC address entry in the MAC address table, record the MAC address, the priority, the customer virtual LAN identification (VLAN ID), and the service VLAN ID extracted from the uplink message, query the corresponding flexible QinQ information in the pre-configured flexible QinQ table, and record it to the added MAC address entry.

The message is an uplink message, and the QinQ transformation board is also set to: if the corresponding MAC address entry is not searched out, add a MAC address entry in the MAC address table, record the MAC address, the priority, the customer virtual LAN identification (VLAN ID), and the service VLAN ID extracted from the uplink message, query the corresponding flexible QinQ information in the pre-configured flexible QinQ table, and record it to the added MAC address entry.

The message is an uplink message; the QinQ transformation board is also set to: compare the MAC address, the priority, the customer VLAN ID, and the service VLAN ID extracted from the uplink message with the MAC address, the priority, the customer VLAN ID and the service VLAN ID in the corresponding searched-out MAC address entry, if the comparison result is that they are not identical, end.

The QinQ transformation board is also set to: if the comparison result is that they are identical, check whether a update identification in the corresponding MAC address entry identifies that the entry needs to be updated or not, if yes, query the corresponding flexible QinQ information from the pre-configured flexible QinQ table, update the corresponding MAC address entry, and perform the flexible QinQ transformation; otherwise, perform the flexible QinQ transformation. The message is a downlink message;

the QinQ transformation board is also set to: if the corresponding MAC address entry is not searched out, directly forward or discard the downlink message.

The MAC address entry in the MAC address table comprises an aging identification;

the QinQ transformation board is also set to: if the MAC address entry is not learnt or queried in the aging time, set the aging identification to identify that the MAC address entry has aged, and delete the aged MAC address entry according to the aging identification.

The flexible QinQ information comprises: information of the new customer VLAN ID, the service VLAN ID, the priority, and the transformation operation.

In summary, by the present invention, the QinQ entry is bound with the MAC address to fast forward the messages based on the hit rate of the MAC address, the present invention gets rid of the costly network processors, and it can achieve the storage of the flexible QinQ information and the fast message forwarding only on a simple interface board, it overcomes the problem in the prior art that the speed of massive searching for the QinQ entries is slow, meanwhile, it expands the interests of the operators and the network product users.

BRIEF DESCRIPTION OF DRAWINGS

FIG. 1 is a schematic diagram of a QinQ encapsulation format in the prior art;

FIG. 2 is a flow chart of a method for implementing flexible QinQ in accordance with an embodiment of the present invention;

PREFERRED EMBODIMENTS OF THE PRESENT INVENTION

Figure 3:
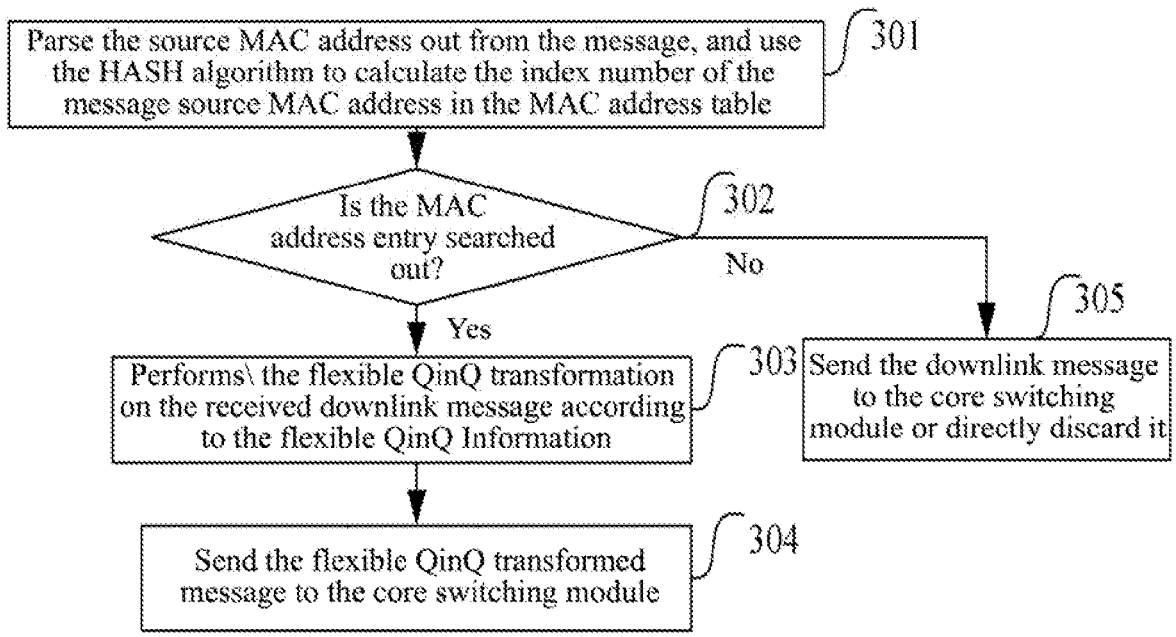
FIG. 3 is a flow chart of a method for processing a downlink message in accordance with an embodiment of the present invention.

The present invention uses the QinQ transformation board with a common processor chip to replace the expensive network processor; and binds the MAC address with the QinQ entry to store, and takes the restriction of the message's MAC address and VLAN ID in time and space into account; therefore, it can forward the uplink and downlink messages fast.

In practical applications, the messages and services entering the QinQ transformation board from the user side in a certain time period are limited, the VLAN ID is used to identify users and services, and therefore, one kind of messages usually uses a fixed VLAN ID. In this embodiment, when the QinQ transformation board learns the MAC address, the QinQ transformation relationship is also recorded in the MAC address table. Since the users use different VLANs to achieve different services, the QinQ transformation rules of different VLANs are not the same, and therefore, the same MAC address might have a number of different records.

Assume in a period of time, the users entering into the exchange system are relatively concentrated, so as the valid MAC address table entries on the QinQ transformation board, under a VLAN ID, the messages that take the same MAC address as the source address will concentrate to enter the QinQ transformation board in a period of time, at this time, it does not need to massively search for the QinQ transformation rules, and it only needs to search the MAC address entries, modify the message information according to the record in the MAC address and complete the message forwarding. After the last time of learning and hitting the MAC address, the address is cleared when it surpasses over the address aging time set in the system, and it needs to be learnt again at the next time.

For the downlink message, there is no need to search for the QinQ entry, as long as the MAC address is hit, the VLAN Tag used to spread the message in the public network is transformed to the VLAN Tag needed at the user side's network, the inverse transformation of the flexible QinQ is integrated with the MAC address searching, saving valuable performance.

In the following, the specific embodiments of the present invention will be described with combination of the accompanying drawings.

FIG. 2 is a method for implementing flexible QinQ in accordance with an embodiment of the present invention, comprising the following steps:

Step S201: pre-allocate the MAC address table storage space and the flexible QinQ table storage space on the QinQ transformation board.

Step S202: pre-create a flexible QinQ in the flexible QinQ table storage space;

the configuration of the flexible QinQ table can refer to the specification of the Chinese Patent application whose application No. is 200610138023.4.

Step S203: the QinQ transformation board receives the messages.

If a message received by the QinQ transformation board is an uplink message, that is, the message is forwarded to the QinQ transformation board from the user side through the core switching module, then proceed to step S204; if the received message is a downlink message, that is, the message enters the QinQ transformation board from the uplink device or the other switching systems, proceed to the steps S301-S305.

Step S204: the QinQ transformation board parses the uplink message, extracts the MAC address, the customer VLAN ID, the service VLAN ID and the priority (COS).

Step S205: apply the HASH algorithm to the source MAC address (SA) to obtain the index number of the message source MAC address in the MAC address table.

The MAC address table uses the HASH algorithm result of the source MAC address as the index number.

Step S206: the QinQ transformation board searches for the MAC address table based on the index number calculated in the S205, if the MAC address entry is not searched out, proceed to the step S207; otherwise, proceed to step S209.

Table 1 shows one MAC address entry in the MAC address table in this embodiment.

TABLE 1

| Name | Storage unit offset (bit) | Bits | Description |
| --- | --- | --- | --- |
| MAC | 87 | BIT[134:87] | MAC address |
| CVLAN | 75 | BIT[86:75] | Original customer VLAN ID |
| SPVLAN | 63 | BIT[74:63] | Original service VLAN ID |
| N_SPVLAN | 51 | BIT[62:51] | New SPVLAN |
| N_CVLAN | 39 | BIT[50:39] | New CVLAN |
| N_PRI | 36 | BIT[38:36] | New priority information |
| AGE | 35 | BIT[35] | 1: this entry is in use, no deletion; 2: not in use and the aging time is exceeded, delete; |
| UPLOG | 34 | BIT[34] | 1: this entry needs to be updated; 0: no update is needed |

The MAC address table can implement the idea of cache through the aging, that is, in a period of time, only the information ((VLAN ID, COS, and so on) related to part of MAC addresses is in the MAC address table, the aging identification is stored in the MAC address entry, the aging time can be set as desired, if the corresponding MAC address entry in the aging time is not learnt or found, the aging identification is set as aged, and the aged MAC address entry is deleted in the process of maintaining the MAC address table.

Furthermore, if the flexible QinQ information related to the VLAN ID, the COS, and so on in the MAC address table changes, it needs to set the MAC address update identification in the corresponding MAC address entry as that the update is needed, when learning the MAC address, if it finds that the entry needs to be updated, update the MAC address entry.

In this embodiment, the flexible QinQ table can be figuratively described as the memory, while the MAC address table is equivalent to the Cache, and it caches the contents often used in a fixed period of time in the memory to avoid massive searching in the flexible QinQ table.

Step S207, add a MAC address entry in the MAC address table, record the source MAC address, the COS, the customer VLAN ID, and the service VLAN ID of the message.

Step S208: query the flexible QinQ table, obtain the corresponding flexible QinQ information, record it to the MAC address entry, and proceed to step 212.

The flexible QinQ information comprises information of the new customer VLAN ID, the new service VLAN ID, the COS, and the transformation operation and so on.

The process of querying the flexible QinQ table can refer to the specification of the Chinese patent whose application number is 200610138023.4.

Step S209: compare the source MAC address, the customer VLAN ID, the service VLAN ID, and the COS in the message with their peers in the searched-out MAC address entry, if they are the same, proceed to step 210; otherwise, end the process.

Step S210: check whether the update identification in the searched-out MAC address entry is that the entry needs to be updated or not, if it is identified as to be updated, proceed to step S211; otherwise, proceed to step 212.

If the update is needed, it illustrates that the related flexible QinQ information in the flexible QinQ table has changed, and the MAC address entry needs to be updated. The update identification in the MAC address entry is modified when modifying the flexible QinQ information in the flexible QinQ table.

Step S211: query the flexible QinQ table, obtain the corresponding flexible QinQ information, and record it to the MAC address entry.

Step S212: the QinQ transformation board performs the flexible QinQ transformation and forwarding on the received uplink message according to the flexible QinQ Information.

FIG. 3 is the process of processing a downlink message in the method for implementing the flexible QinQ in this embodiment, comprising:

step S301: parse the source MAC address out from the message, use the HASH algorithm to calculate the index number of the message source MAC address in the MAC address table according to the source MAC address;

step S302: the QinQ transformation board searches the MAC address table according to the index number, if the MAC address entry is not searched out, proceed to the step S305; otherwise, proceed to step S303;

step S303: the QinQ transformation board performs the flexible QinQ transformation on the received downlink message according to the flexible QinQ Information;

step S304: send the flexible QinQ transformed message to the core switching module, and end;

step S305: send the received downlink message to the core switching module or directly discard it, and end.

Since the corresponding uplink message has been processed before receiving the downlink message, for the received downlink message, the MAC address entry can be usually searched out, if the entry cannot be searched, directly forward or discard the received downlink message.

Figure 4:
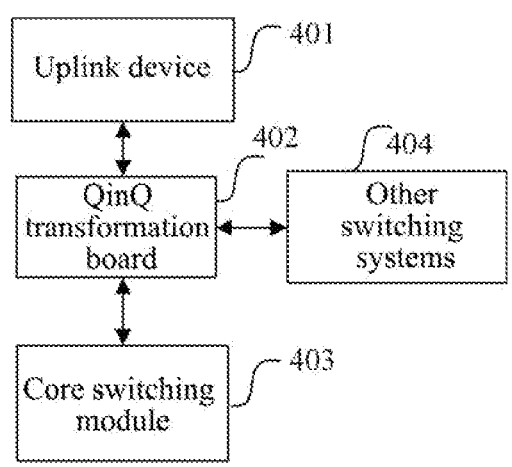
FIG. 4 is a structure diagram of a device for implementing flexible QinQ in accordance with an embodiment of the present invention.

FIG. 4 shows the device for implementing the flexible QinQ in this embodiment, comprising: the QinQ transformation board 401, the uplink device 402, the core switching module 403 and the other switching systems 404, the QinQ transformation board 401 is connected with the uplink device 402, the core switching module 403 and the other switching systems 404 respectively;

the uplink device 402 and the other switching systems 404 send downlink messages to the QinQ transformation board 401, the core switching module 403 is also connected with the user side single board and send the user side uplink messages to the QinQ transformation board 401.

The QinQ transformation board is set to: receive messages sent by the uplink device, the core switching module and the other switching systems, after receiving a message, search for the corresponding MAC address entry of the message in the Media Access Control (MAC) address table, and if the corresponding MAC address entry is searched out, perform the flexible QinQ transformation on the received message according to the flexible QinQ information included in the MAC address entry, and forward the message after completing the flexible QinQ transformation; when the received message is an uplink message, if the corresponding MAC address entry is not searched out, add the MAC address entry in the MAC address table, and record the MAC address, the priority, the customer VLAN ID and the service VLAN ID extracted from the uplink message, and query the corresponding flexible QinQ information from the pre-configured flexible QinQ table, and record it to the added MAC address entry.

The MAC address entry in the MAC address table comprises an aging identification, if the MAC address entry is not learnt or queried in the aging time, the QinQ transformation board sets the aging identification to identify that the MAC address entry has aged, and delete the aged MAC address entry according to the aging identification.

The other functions of each part of the device can refer to the description of the content of the method.

This embodiment also provides a QinQ transformation board, and it is set to:

receive the messages sent by the uplink device, the core switching module and the other switching systems, after a message is received, search for the corresponding MAC address entry of the message in the media Admission Control (MAC) address table, and if the corresponding MAC address entry is searched out, perform the flexible QinQ transformation on the received message based on the flexible QinQ information included in the MAC address entry, and forward the message after completing the flexible QinQ transformation.

The message is an uplink message; the QinQ transformation board is also set to: if the corresponding MAC address entry is not searched out, add a MAC address entry in the MAC address table, record the MAC address, the priority, the customer virtual LAN identification (VLAN ID), and the service VLAN ID extracted from the uplink message, query the corresponding flexible QinQ information from the pre-configured flexible QinQ table, and record it to the added MAC address entry.

The message is an uplink message; the QinQ transformation board is also set to: compare the MAC address, the priority, the customer VLAN ID, and the service VLAN ID extracted from the uplink message with the MAC address, the priority, the customer VLAN ID and the service VLAN ID in the corresponding searched-out MAC address entry, if the comparison result is that they are not identical, end the process.

The QinQ transformation board is also set to: if the comparison result is that they are identical, check whether the update identification in the corresponding MAC address entry shows that the entry needs to be updated or not, if yes, query the corresponding flexible QinQ information from the pre-configured flexible QinQ table, update the corresponding MAC address entry, and perform the flexible QinQ transformation; otherwise, perform the flexible QinQ transformation.

The message is a downlink message; the QinQ transformation board is set to: if the corresponding MAC address entry is not searched out, directly forward or discard the downlink message.

The MAC address entry in the MAC address table comprises an aging identification;

the QinQ transformation board is also set to: if the MAC address entry is not learnt or queried in the aging time, set the aging identification to identify that the MAC address entry has aged, and delete the aged MAC address entry according to the aging identification.

The flexible QinQ information comprises: information of the new customer VLAN ID, the new service VLAN ID, the new priority, and the new transformation operation.

The above description is only the preferred embodiments of the present invention and is not used to limit the present invention, for those skilled in the art, the present invention can have a variety of modifications and changes. Without departing from the spirits and principles of the present invention, any changes, equivalent replacements and improvements should be included within the protection scope of the present invention.

INDUSTRIAL APPLICABILITY

In the present invention, the QinQ entry is bound with the MAC address to achieve fast forward of the messages based on the hit rate of the MAC address, which gets rid of the costly network processors, and it can achieve the storage of the flexible QinQ information and the fast message forwarding only on a simple interface board, therefore, it overcomes the problem in the prior art that the speed of massive searching for the QinQ entries is slow, meanwhile, it expands the interests of the operators and the network product users.

What is claimed is:

1. A method for implementing flexible QinQ, comprising:
    pre-configuring a flexible QinQ table in a flexible QinQ table storage space on a QinQ transformation board and bindingly storing a media access control (MAC) address entry with flexible QinQ information in an expanded MAC address table which is stored in a MAC address table storage space on the QinQ transformation board, wherein one MAC address entry of the expanded MAC address table comprises a MAC address, an original customer Virtual Local Area Network Identification (VLAN ID), an original service VLAN ID and the flexible QinQ information, said flexible QinQ information comprises a new customer VLAN ID, a new service VLAN ID, a new priority information, and information of transformation operation;

when receiving a message by the QinQ transformation board, searching for a MAC address entry corresponding to the message in the expanded MAC address table, if a corresponding MAC address entry is searched out, performing a flexible QinQ transformation on the received message in accordance with flexible QinQ information included in the MAC address entry, and forwarding the message after completing the flexible QinQ transformation;

when the QinQ transformation board learns the MAC address, the QinQ transformation relationship is also recorded in the expanded MAC address table; the same MAC address have a number of different records corresponding to different VLANs for achieving different services.

2. The method of claim 1, wherein:
    the message is an uplink message;
    after the step of searching for a MAC address entry corresponding to the message in the expanded MAC address table, the method also comprises:
    if no corresponding MAC address entry is searched out, adding a MAC address entry in the expanded MAC address table, recording a MAC address, a priority, a customer VLAN ID, and a service VLAN ID extracted from the uplink message, querying flexible QinQ information corresponding to the MAC address, the priority, the customer VLAN ID and the service VLAN ID in the pre-configured flexible QinQ table, and recording the queried flexible QinQ information to the added MAC address entry.

3. The method of claim 2, wherein, after the step of recording the queried flexible QinQ information to the added MAC address entry, the method further comprises:
    performing flexible QinQ transformation on the received uplink message based on the queried flexible QinQ information, and forwarding the message after completing the flexible QinQ transformation.

4. The method of claim 1, wherein:
    the message is an uplink message;
    when searching out the corresponding MAC address entry, the method further comprises: comparing a MAC address, a priority, a customer VLAN ID, and a service VLAN ID extracted from the uplink message with a MAC address, a priority, and a customer VLAN ID and a service VLAN ID in the corresponding MAC address entry searched out, if the comparison result is that they are not identical, discarding the uplink message.

5. The method of claim 4, wherein, said method also comprises:
    if the comparison result is that they are identical, checking whether an update identification in the corresponding MAC address entry identifies the entry need to be updated or not, if yes, querying flexible QinQ information corresponding to the MAC address entry, the priority, the customer VLAN ID and the service VLAN ID from the pre-configured flexible QinQ table, updating the corresponding MAC address entry with the queried flexible QinQ information, and continuing to process the step of implementing the flexible QinQ transformation on the received message; if the corresponding MAC address entry need not to be updated, continuing to directly process the step of implementing the flexible QinQ transformation on the received message.

6. The method of claim 1, wherein:
the message is a downlink message;
the method further comprises: if no corresponding MAC address entry is searched out, directly forwarding or discarding the downlink message.

7. The method of claim 1, wherein:
an MAC address entry in the expanded MAC address table comprises an aging identification;
the method further comprises: if the MAC address entry is not learnt or queried in an aging time, setting the aging identification to identify that the MAC address entry is aged, and deleting the aged MAC address entry according to the aging identification.

8. A device for implementing flexible QinQ, comprising: a QinQ transformation board, an uplink device, a core switching module and other switching systems, the QinQ transformation board being connected with the uplink device, the core switching module and the other switching systems, wherein:
the QinQ transformation board is set to: pre-configure a flexible QinQ table in a pre-allocated flexible QinQ table storage space on the QinQ transformation board and bindingly storing a media access control (MAC) address entry with flexible QinQ information in an expanded MAC address table which is stored in a pre-allocated storage space on the QinQ transformation board, wherein one MAC address entry of the expanded MAC address table comprises a MAC address, an original customer Virtual Local Area Network Identification (VLAN ID), an original service VLAN ID and the flexible QinQ information, said flexible QinQ information comprises a new customer VLAN ID, a new service VLAN ID, a New priority information, and information of transformation operation;
receive messages sent by the uplink device, the core switching module and the other switching systems, when receiving a message, search for a MAC address entry corresponding to the message in the expanded MAC address table, and if a corresponding MAC address entry is searched out, perform a flexible QinQ transformation on the received message according to the flexible QinQ information included in the MAC address entry, and forward the message after completing the flexible QinQ transformation;
wherein when the QinQ transformation board learns the MAC address, the QinQ transformation relationship is also recorded in the expanded MAC address table; the same MAC address have a number of different records corresponding to different VLANs for achieving different services.

9. A QinQ transformation board, which is set to:
pre-allocate a flexible QinQ table storage space and a media access control (MAC) address table storage space on the QinQ transformation board;
pre-configure a flexible QinQ table in the flexible QinQ table storage space and bindingly store a MAC address entry with flexible QinQ information in an expanded MAC address table which is stored in the MAC address table storage space on the QinQ transformation board, wherein one MAC address entry of the expanded MAC address table comprises a MAC address, an original customer Virtual Local Area Network Identification (VLAN ID), an original service VLAN ID and the flexible QinQ information, said flexible QinQ information comprises a new customer VLAN ID, a new service VLAN ID, a New priority information, and information of transformation operation;
receive messages sent by a uplink device, a core switching module and other switching system, when a message is received, search for a MAC address entry corresponding to the message in the expanded MAC address table, and if a corresponding MAC address entry is searched out, perform a flexible QinQ transformation on the received message based on the flexible QinQ information included in the MAC address entry, and forward the message after completing the flexible QinQ transformation;
wherein when the QinQ transformation board learns the MAC address, the QinQ transformation relationship is also recorded in the expanded MAC address table; the same MAC address have a number of different records corresponding to different VLANs for achieving different services.

10. The QinQ transformation board of claim 9, wherein:
the message is an uplink message;
the QinQ transformation board is further set to: if no corresponding MAC address entry is searched out, add a MAC address entry in the expanded MAC address table, record a MAC address, a priority, a customer VLAN ID, a the service VLAN ID extracted from the uplink message, query flexible QinQ information corresponding to the MAC address, the priority, the customer VLAN ID and the service VLAN ID in the pre-configured flexible QinQ table, and record the queried flexible QinQ information to the added MAC address entry.

11. The QinQ transformation board of claim 10, wherein:
the message is an uplink message;
the QinQ transformation board is further set to: compare the MAC address, the priority, the customer VLAN ID, and the service VLAN ID extracted from the uplink message with the MAC address, the priority, the customer VLAN ID and the service VLAN ID in the corresponding MAC address entry searched-out, if the comparison result is that they are not identical, discard the uplink message.

12. The QinQ transformation board of claim 11, wherein:
the QinQ transformation board is further set to: if the comparison result is that they are identical, check whether an update identification in the corresponding MAC address entry identifies the entry needs to be updated, if yes, query flexible QinQ information corresponding to the MAC address entry from the pre-configured flexible QinQ table, update the corresponding MAC address entry with the queried flexible QinQ information, and perform the flexible QinQ transformation; if the corresponding MAC address entry needs not to be updated, directly perform the flexible QinQ transformation.

13. The QinQ transformation board of claim 9, wherein:
the QinQ transformation board is further set to: if no corresponding MAC address entry is searched out, directly forward or discard the downlink message.

14. The QinQ transformation board of claim 9, wherein:
a MAC address entry in the expanded MAC address table comprises an aging identification;
the QinQ transformation board is further set to: if the MAC address entry is not learnt or queried in an aging time, set the aging identification to identify that the MAC address entry is aged, and delete the aged MAC address entry according to the aging identification.

* * * * *